US012694431B2

(12) United States Patent
Bradley et al.

(10) Patent No.: US 12,694,431 B2
(45) **Date of Patent: \*Jul. 28, 2026**

(54) AVATAR-BASED PROMOTIONS

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/034,789

(22) Filed: Jan. 23, 2025

(65) Prior Publication Data

US 2025/0166023 A1 May 22, 2025

Related U.S. Application Data

(63) Continuation of application No. 17/811,122, filed on Jul. 7, 2022, now Pat. No. 12,236,458.

(51) Int. Cl.
*G06Q 30/00* (2023.01)
*G06Q 30/0241* (2023.01)
*G05B 19/418* (2006.01)

(52) U.S. Cl.
CPC .............................. *G06Q 30/0277* (2013.01)

(58) Field of Classification Search
CPC .................................................. G06Q 30/0277
See application file for complete search history.

(56) References Cited

U.S. PATENT DOCUMENTS 6,366,285 B1 * 4/2002 Brush, II ................ G06F 3/011
715/848
2009/0063283 A1 * 3/2009 Kusumoto ............. G06Q 30/02
705/14.25

(Continued)

OTHER PUBLICATIONS

"Methods, systems, and media for prompting influential users to promote content". IPCOM. 2014. (Year: 2014).*

(Continued)

*Primary Examiner* — Maria V Vanderhorst
(74) *Attorney, Agent, or Firm* — Guntin & Gust, PLC; John G. Rauch

(57) ABSTRACT

The disclosed technology is directed towards presenting promotional content via an avatar representing a first, promoter user to a second, target user experiencing a virtual or other environment. The promotional content may be presented via an alteration of the avatar, audio output and/or an object virtually associated with the avatar. The promotional content may be selected based on matching target user data describing a target user experiencing a virtual reality environment. Different users viewing the same avatar at the same time can be presented with different promotional content. Information may be output to attract a target user to perceive the promotional content. The promoter user can interact to obtain a current promotion status notification, as well as to select from available promotional content offerings to promote.

20 Claims, 13 Drawing Sheets

(56)     References Cited

U.S. PATENT DOCUMENTS

| | | | |
|---|---|---|---|
| 2009/0076894 A1* | 3/2009 | Bates | G06Q 30/0264 |
| | | | 705/14.61 |
| 2009/0094106 A1 | 4/2009 | Porter et al. | |
| 2009/0132361 A1 | 5/2009 | Titus et al. | |
| 2019/0108686 A1 | 4/2019 | Spivack et al. | |
| 2019/0188751 A1 | 6/2019 | Crowe et al. | |
| 2024/0013262 A1 | 1/2024 | Bradley et al. | |

OTHER PUBLICATIONS

"Enhancing Participation Experience in VR Live Concerts by Improving Motions of Virtual Audience Avatars". IEEE. 2020. (Year: 2020).*

Toward Tactile Internet in Beyond 5G Era: Recent Advances, Current Issues, and Future Directions. IEEE. 2020. (Year: 2020).

* cited by examiner

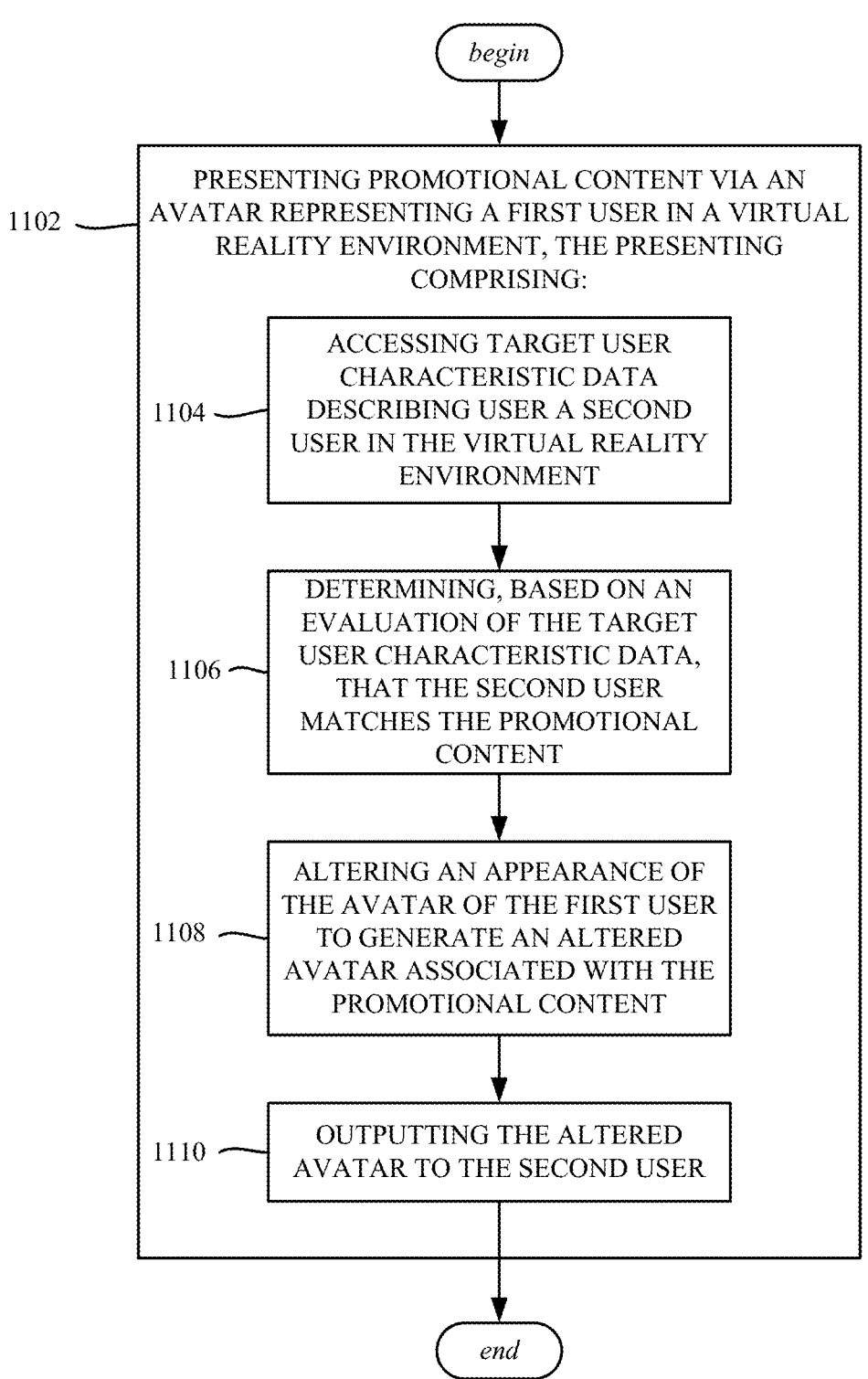

begin

1102 — PRESENTING PROMOTIONAL CONTENT VIA AN AVATAR REPRESENTING A FIRST USER IN A VIRTUAL REALITY ENVIRONMENT, THE PRESENTING COMPRISING:

1104 — ACCESSING TARGET USER CHARACTERISTIC DATA DESCRIBING USER A SECOND USER IN THE VIRTUAL REALITY ENVIRONMENT

1106 — DETERMINING, BASED ON AN EVALUATION OF THE TARGET USER CHARACTERISTIC DATA, THAT THE SECOND USER MATCHES THE PROMOTIONAL CONTENT

1108 — ALTERING AN APPEARANCE OF THE AVATAR OF THE FIRST USER TO GENERATE AN ALTERED AVATAR ASSOCIATED WITH THE PROMOTIONAL CONTENT

1110 — OUTPUTTING THE ALTERED AVATAR TO THE SECOND USER end

MOBILE HANDSET

APPLICATIONS — 1206

CLIENT (STORE, DISCOVERY, PLAY) — 1246

FIRMWARE — 1208

VIDEO COMP — 1230

TRIGGER COMPONENT — 1238

DISPLAY — 1212

HYSTERESIS COMPONENT — 1236

SUBSCRIBER IDENTITY SYSTEM — 1218  1220

CAMERA — 1222

SIP CLIENT — 1240

COMMUNICATION COMPONENT — 1210

CELL TCVR — 1211    WIFI TCVR — 1213

PROCESSOR — 1202

SERIAL I/O INTERFACE — 1214

MEMORY — 1204

LOCATION COMPONENT — 1232

USER INPUT — 1235

AUDIO I/O — 1216

POWER SOURCE — 1224

POWER I/O — 1226

AVATAR-BASED PROMOTIONS

CROSS-REFERENCE TO RELATED APPLICATION

This application is a continuation of U.S. patent application Ser. No. 17/811,122 filed on Jul. 7, 2022. All sections of the aforementioned application are incorporated herein by reference in their entirety.

FIELD OF THE DISCLOSURE

The subject application relates to the presentation of promotional content in general, and more particularly to presenting content in association with an avatar, and related embodiments.

BACKGROUND

Contemporary consumers of products and services are often influenced by others in making purchasing decisions. Further, even without a direct sale, product and/or service providers seek to have their brand or name widely promoted so that when a consumer does make a purchasing decision, the consumer is familiar with their brand.

At the same time, many contemporary consumers are not easily reached through traditional media such as television and print advertising. As such, presenting promotions in other environments is valuable to product and service providers.

BRIEF DESCRIPTION OF THE DRAWINGS

Reference will now be made to the accompanying drawings, which are not necessarily drawn to scale, and wherein:

FIG. 11 is a flow diagram representing example operations related to presenting promotional content via an avatar representing a first user in a virtual reality environment based on target user characteristic data, in accordance with various aspects and embodiments of the subject disclosure.

DETAILED DESCRIPTION

Figure 1:
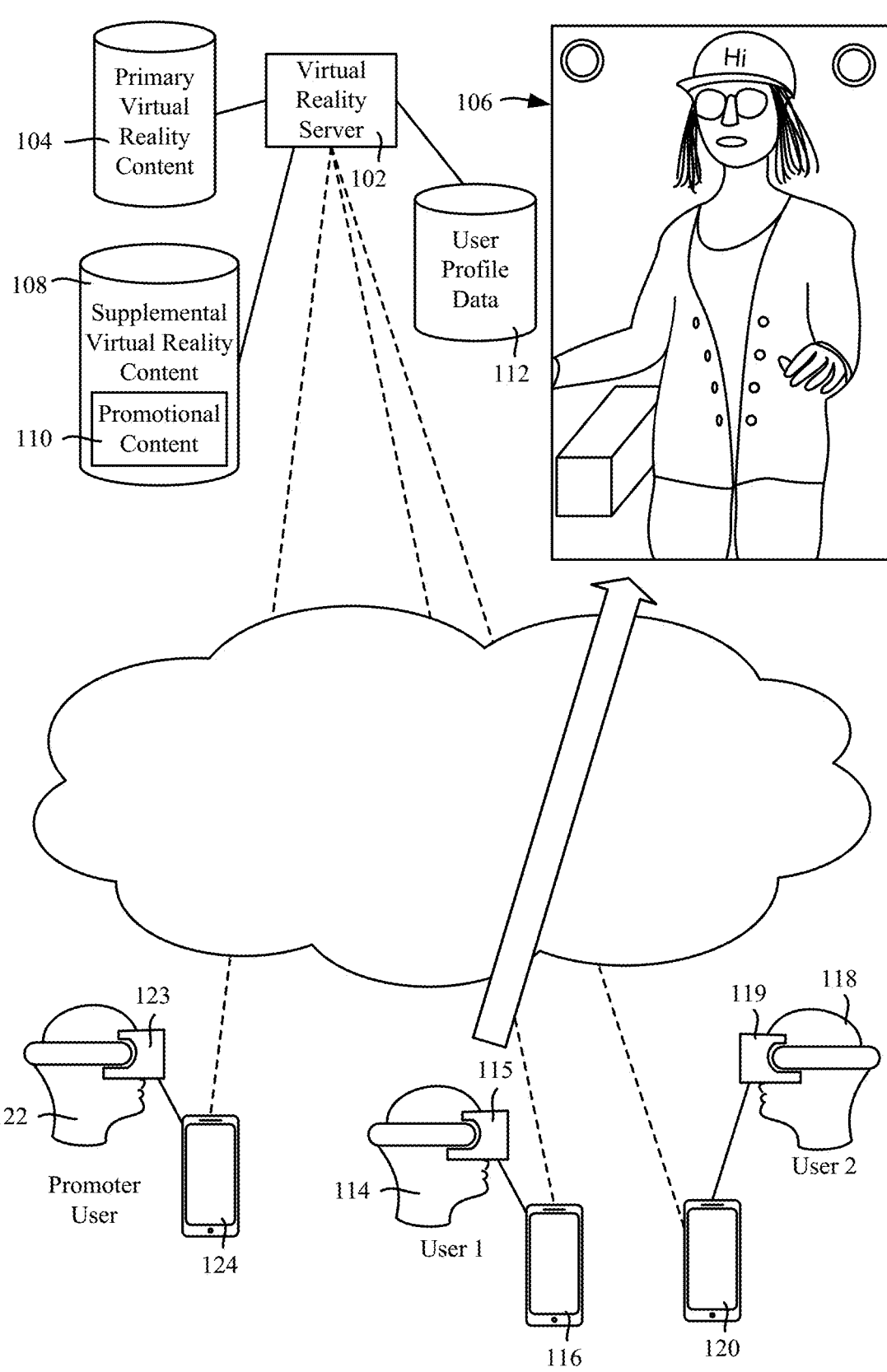
FIG. 1 is a block diagram of an example system and representation of a virtual environment for presenting promotional content via an avatar in the virtual environment, in accordance with various aspects and embodiments of the subject disclosure.

The technology described herein is generally directed towards the creation and virtual presentation of product and/or service promotions via the alteration of avatars and/or objects associated with avatars that appear within environments such as virtual reality environments/the metaverse. The promotions may be presented via visual, aural, and other avatar and/or objects alterations.

Promotional content may be created and presented based on an analysis of profile data of a presenting avatar and a receiving (target) user who will perceive the promotional content. The technology described herein thus makes available an efficient and highly useful solution for products or services of promoting parties to be promoted in an effective and generally non-obtrusive manner within a virtual reality environment.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a virtual reality server 102, which based on primary virtual reality content 104, outputs a virtual environment 106 in which one or more virtual reality users can exist, e.g., as avatars representing actual users. The virtual reality server 102 is also coupled to a source of supplementary virtual reality content 108 that includes promotional content 110 for presentation as described herein.

As described herein, the presentation of promotional content can be based on user profile data 112. This allows users, via output devices (e.g., virtual reality headsets), which may be coupled to user devices, to experience different promotions. As represented in the example of FIG. 1, a user 1 (labeled 114) is depicted with a virtual reality headset 115 and communications device 116; a user 2 (labeled 118) is similarly depicted with a virtual reality headset 119 and communications device 120. Further, a promoter user 122 is depicted with a virtual reality headset 123 and communications device 124.

Although not explicitly shown, it is understood that other output (and input) devices may be associated with users in the environment, e.g., wearable devices, microphones, cameras, audio output devices (e.g., earbuds, headphones, speakers and so on), and the like. Further, although a virtual reality environment is shown in FIG. 1, it is feasible for other user(s) to experience the environment in other ways, such via a two-dimensional display device. In another embodiment, other forms of visual modifications may be produced by the server 102, such as augmented or diminished reality (overlay of non-virtual objects 106 with additive (AR) or subtractive (DR) graphics seen through a display or goggles) or extended reality (overlay of real and virtual objects (XR) and/or tactile components seen through a display or goggles).

Figure 2:
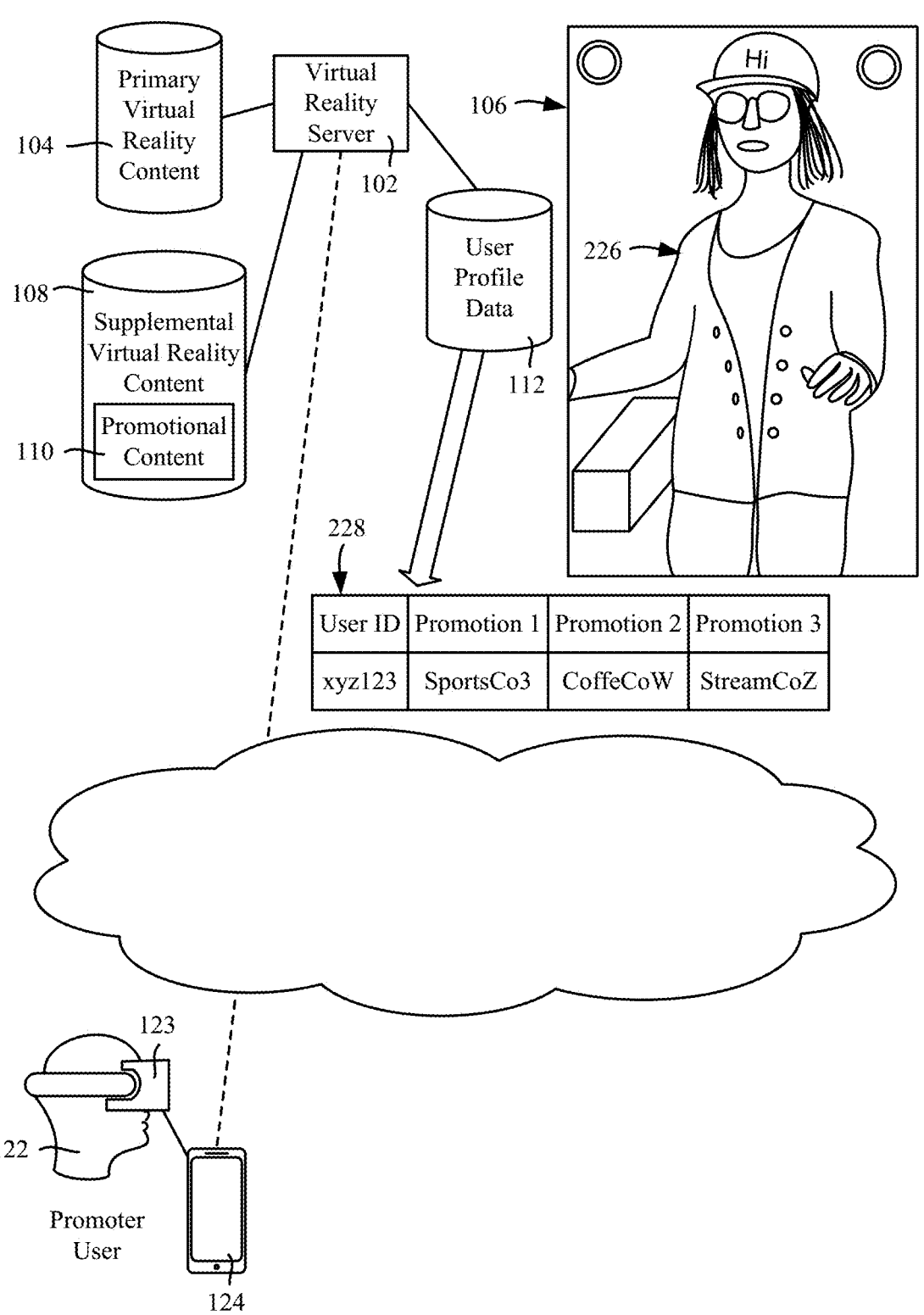
FIG. 2 is a block diagram of an example system for presenting promotional content via an avatar of a user and promoting parties as maintained in an example data structure, in accordance with various aspects and embodiments of the subject disclosure.

As shown in FIG. 2, the promoter user 122 is represented in the virtual reality environment 106 by an avatar 226. To this end, a user in a virtual reality environment may be designated as a promoter user, e.g., as a type of user. As such, the promoter user 122 engages in an agreement with another party to promote their product, service, or other item of value, in exchange for some type of credit or compensation. For example, the promoter user 122 may have an agreement to promote a sporting goods company. The promoter user 122 may promote more than one other party via his or her promotion services.

The relationship between the promoter user 122 and the one or more other parties may be stored in the user profile data 112. It is alternatively feasible to have a separate data store for promoter users versus other users. In the example of FIG. 2, a data structure 228 (e.g., a database record) or the like exists for the promoter user 122, such as with a system-unique identifier (User ID), and the one or more promotions associated with that identifier, e.g., SportsCo3, CoffeCoW and StreamCoZ (although actual brand/company names can be used).

Promotional content for each promoted party may be stored in the supplementary virtual reality content database 108, e.g., as files, links or other data structures. These entries (e.g., files) represent insertable content that can be combined with primary virtual reality content to create personally-directed promotions to other users in the virtual reality environment. For each promoted party, there may be one or more promotion content elements stored within the supplementary virtual reality content database. As shown in the example data structure 330 of FIG. 3, these content elements may be of differing types, such as image, audio, video, text, or other data. In this way, the proper type or types may be chosen for insertion at the time of the promotion event.

Figure 3:
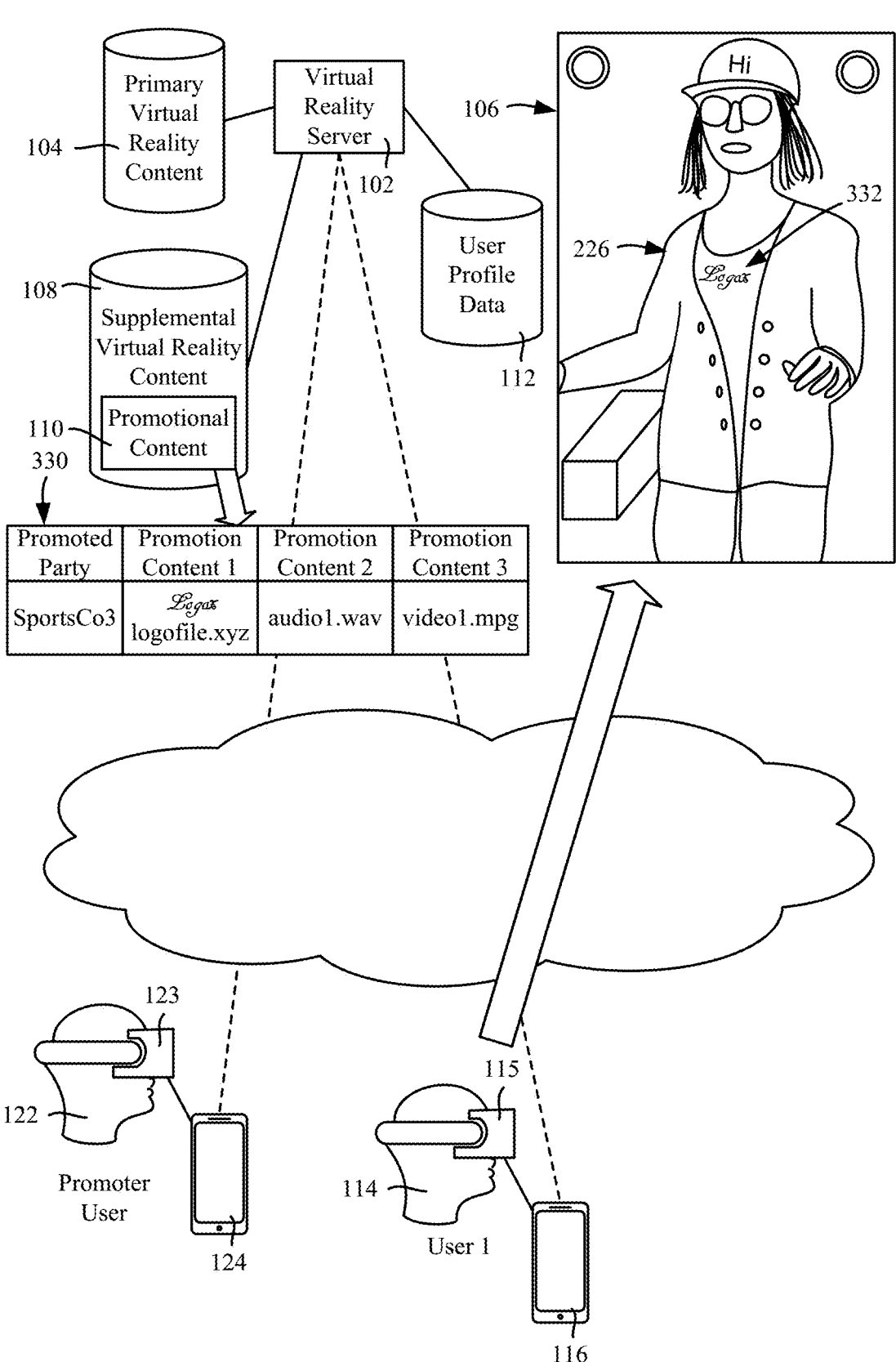
FIG. 3 is a block diagram of an example system for presenting first promotional content to a first user via an avatar of a user and promotional content data maintained in an example data structure, in accordance with various aspects and embodiments of the subject disclosure.

As also shown in the example of FIG. 3, when another user, user 1 (114), encounters the promoter user (via avatar 226) within the virtual reality environment 106, an encounter is detected by the virtual reality server 102. This can be by virtue of the proximity of the two users in the virtual reality environment 106 and/or being within the field of view of user 1. That is, if the promoter user avatar 226 is within the field of view of user 1 (114), an encounter is detected. Proximity to a user, instead of or in addition to a user's field of view, may be used for audio output as described herein.

Upon the detection of the encounter, the promoter user avatar 226 may be presented as primary virtual reality content. In addition, the virtual reality server may retrieve supplementary virtual reality content in the form of promotional content and use it in the rendering of the promoter user avatar. In one embodiment, the clothing of the promoter user avatar may be altered so as to include the promotion content. In the example of FIG. 3, a rendering of the logo 332 maintained for SportsCo3 appears on the shirt of the promoter user avatar 226 when the user 1 (114) is viewing her.

In a similar manner, an encounter may be detected between the promoter user avatar and the avatar for user 2 (118). The duration of time of the encounter may or may not overlap with the encounter between the promoter user avatar 226 and the avatar of user 1 (114). In any event, the presentation of the promoter user avatar to user 2 (118) may be different in terms of the presentation of promotional content. That is, the promotional content presented to user 2 (118) may be different than that presented to user 1 (114).

Figure 4:
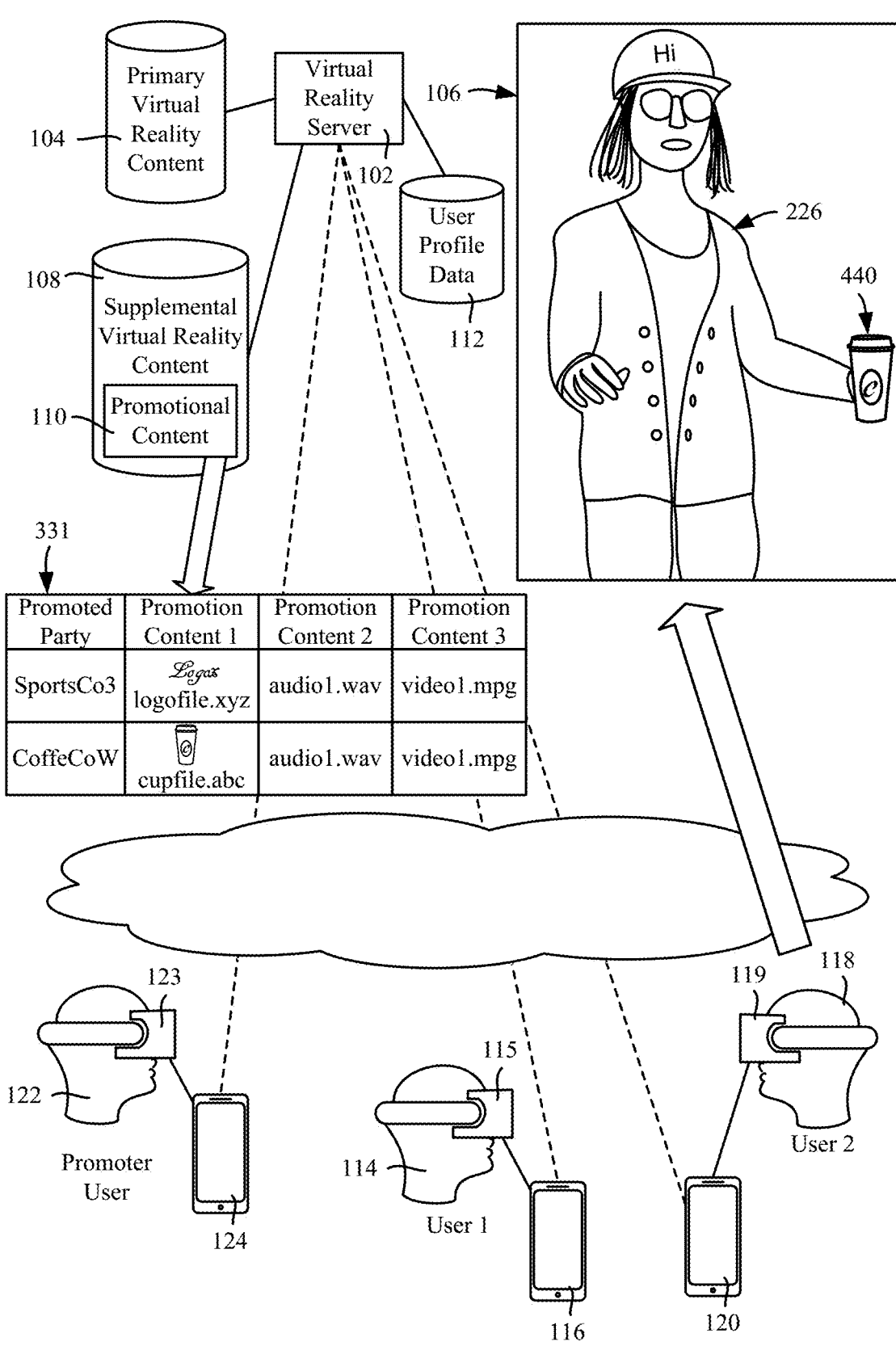
FIG. 4 is a block diagram of an example system for presenting second promotional content to a second user via an avatar of a user and promotional content data maintained in an example data structure, in accordance with various aspects and embodiments of the subject disclosure.

Potential target users 1 (114) and 2 (118) may also have respective profiles (e.g., database records) in the user profile data 112 or other data store. In this case, characteristics data such as including preferences or other information (e.g., personal likes and dislikes, age data and so on) in the profile data 112 may be used to determine a best match promotion to be presented to user 2 (118), which may be different from the preferences/information for user 1 (114). As a result, the promoter user avatar 226 may have a different presentation to different other users at the same point in time. For example, in FIG. 4, user 2 (118) sees a coffee cup image 440 being held by the promoter user avatar 226, that is visibly rendered to user 2 (114), while the logo on promoter user avatar's shirt disappears. This is based on additional information in the data structure 331 in FIG. 4.

It should be noted that promotional content may be presented in many ways that are associated with a promoter user's avatar. For example, instead of or in addition to rendering an image on clothing worn by a promoter's avatar, a virtual tattoo may be rendered on an altered avatar of the promoter user. Moreover, the avatar need not be altered; for example, if the avatar is seated next to a laptop computer, promotional content can be rendered on the laptop computer's back or other visible area. As another example, the coffee cup 440 need not appear to be being held by the promoter user's avatar, but can be rendered on a table or the like next to the promoter user's avatar in a way that makes it relatively clear that the cup of coffee virtually belongs to the promoter user. Still further, text or the like may accompany a promotion, e.g., a popup notification such as "$1 off on CoffeCoW coffee today" can briefly and/or regularly or occasionally appear on or near the displayed cup of coffee.

Figure 5:
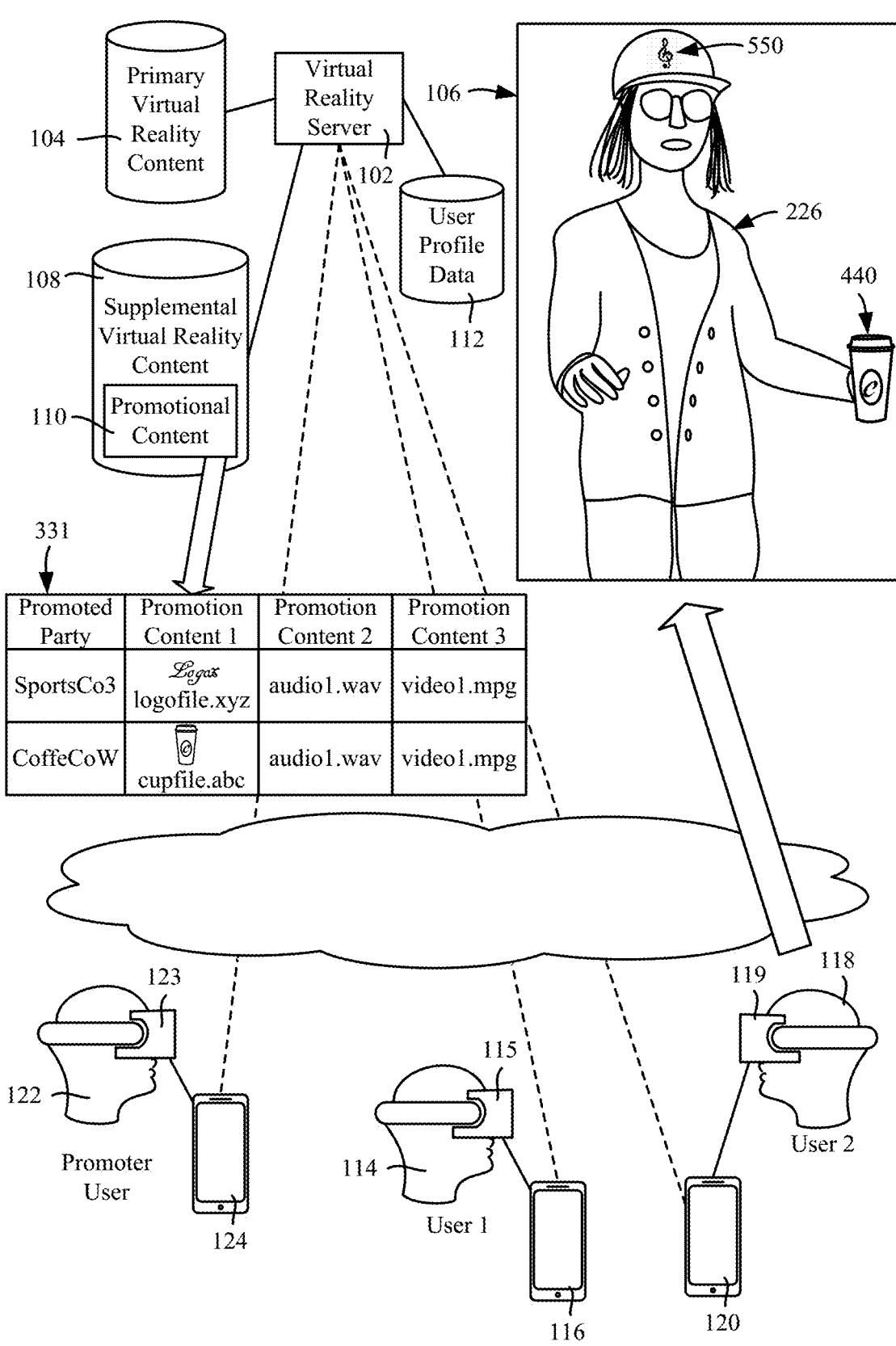
FIG. 5 is a block diagram of an example system and avatar altered to attract a target user to view promotional content, in accordance with various aspects and embodiments of the subject disclosure.

The use of attention-catching visuals to draw attention to the promoter user avatar 226 is also described herein. For example, in another embodiment, the virtual reality server 102 may use the user preference data from the user profiles of user 1 and user 2 to identify attention-catching elements that may be added to draw the attention of user 1 (114) and user 2 (118) to the promoter user avatar. For example, if user 2's profile data indicates that he is a musician, the promoter user avatar may be adjusted during its rendering by using a logo or other supplementary virtual reality content that is representative of music as shown via the treble clef 550 rendered on the hat of the promoter user avatar 226 in FIG. 5. Similarly, if user 1's profile data indicates that she is a fan of a specific baseball team, the promoter user's avatar may be adjusted during its rendering by using a logo or the like that is representative of that baseball team for the presentation of the altered avatar to user 1 (114). This attention-catching element may, but need not be, a promotion itself. Rather, in general its purpose is to draw the attention of user 2 (118) towards the promoter user avatar 226 so that user 2 (118) is exposed to the promotion content, e.g., the coffee cup representation 440.

Figure 6:
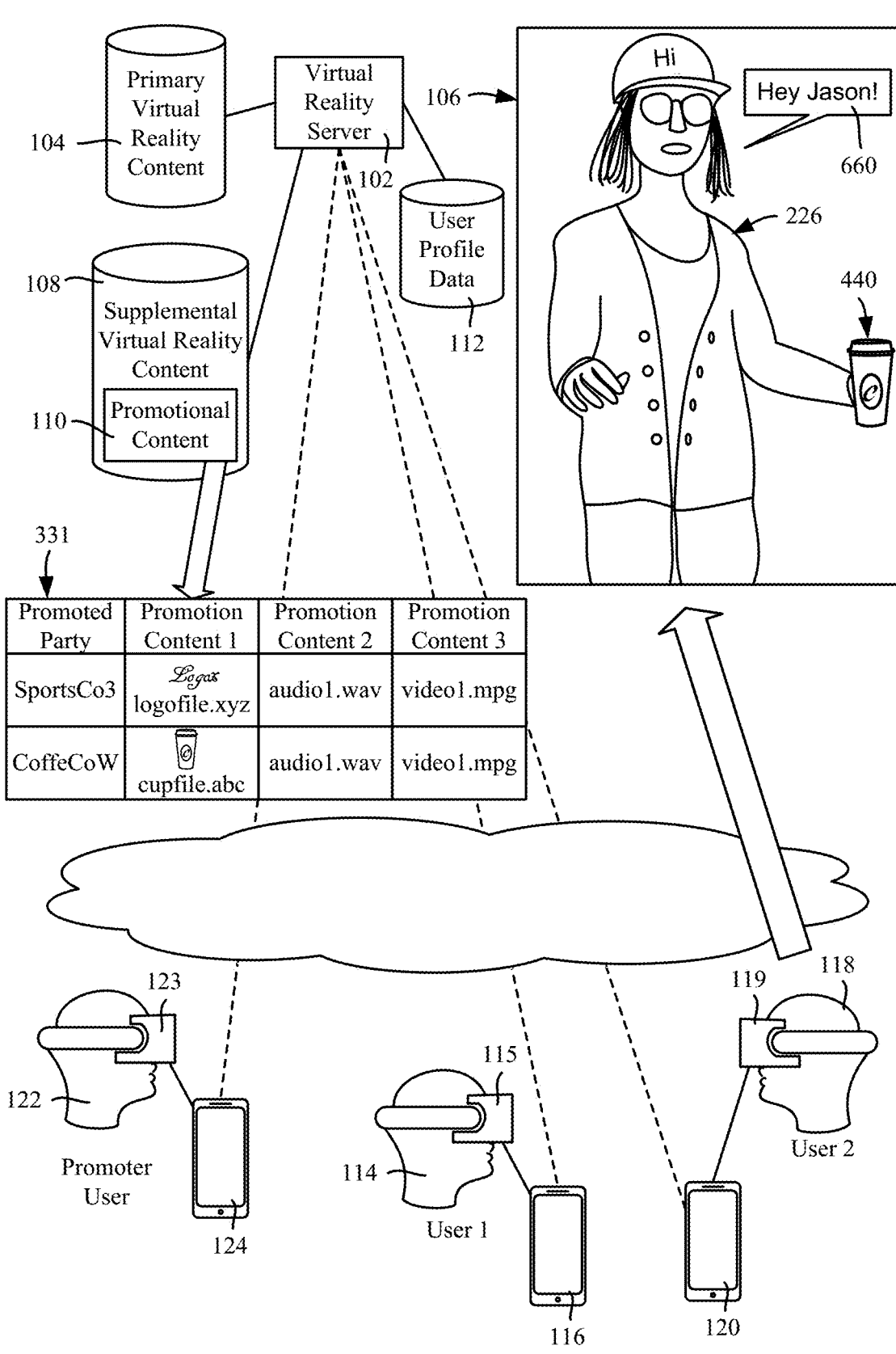
FIG. 6 is a block diagram of an example system and avatar configured attract a target user via audio to view promotional content, in accordance with various aspects and embodiments of the subject disclosure.

FIG. 6 represents the use of attention-catching audio. More particularly, in a similar manner to an attraction image, the promoter user avatar 226 may use supplementary virtual reality content in the form of audio. For example, as represented via the "balloon" 660 in FIG. 6, the promoter user avatar 226 may call out to user 2 (118) or provide another audio cue to draw the attention of user 2 in the direction of the promoter user avatar. Again, this is so that the promotional content 440 is experienced by user 2 (118). The audio queue may be presented in spatial audio such that user 2 (118) detects the direction from which the promoter user avatar 226 is speaking. In this manner, the promoter user avatar 226 need not necessarily be in the field of view of user 2 (118). For instance, the spatial audio presentation of the audio cue may be presented to user 2 (118) such that it sounds like the promoter user avatar is behind the avatar of user 2 (118), and as such calls the attention of user 2 (118) to turn around so as to view the promoter user avatar and be exposed to the promotion content. Music can also be played, e.g., a song known to be liked by a user, the promoting party's "jingle" or the like, which can also be directional from the user 2's listening perspective.

Olfactory output, taste output and/or tactile output also may be part of promotional content. For example, a perfume company, a hamburger restaurant or the like may desire that a smell and/or taste accompany a promotional presentation for metaverse users equipped to receive and recreate smells and tastes. A clothing or fabric company or the like may desire that touch accompany a promotional presentation for metaverse users equipped to receive and recreate touch sensations, which can include temperature as well as texture, for example.

The promoted parties may choose to have control over when their promotions are presented. For example, only certain promoted parties may choose to be participants within a given virtual environment. The virtual reality server 102 may receive an indication of the presence of each user within a proximate area within the virtual environment 106. By knowing which users are within the virtual environment area, the virtual reality server 102 may also create an aggregate profile of the users in an area by combining preferences and tendency data that describe the interests of the users from a combination of the present user profiles. In doing so, each promoted party may choose whether or not to participate in promotions in a given virtual environment. Using this approach, the promoters need not necessarily have a prior agreement to promote specific promoted parties.

When a promoted party chooses to be active in the environment, the party may further designate a level of credits that it will offer to each promoter user who will make his or her avatar available for that promoted party. The decision for each promoted party as to whether or not to be active may be based on rules that the party provides the virtual reality server 102 to determine whether the aggregate profile of the users present in the virtual environment matches a desired target audience for the promoted party.

Figure 7:
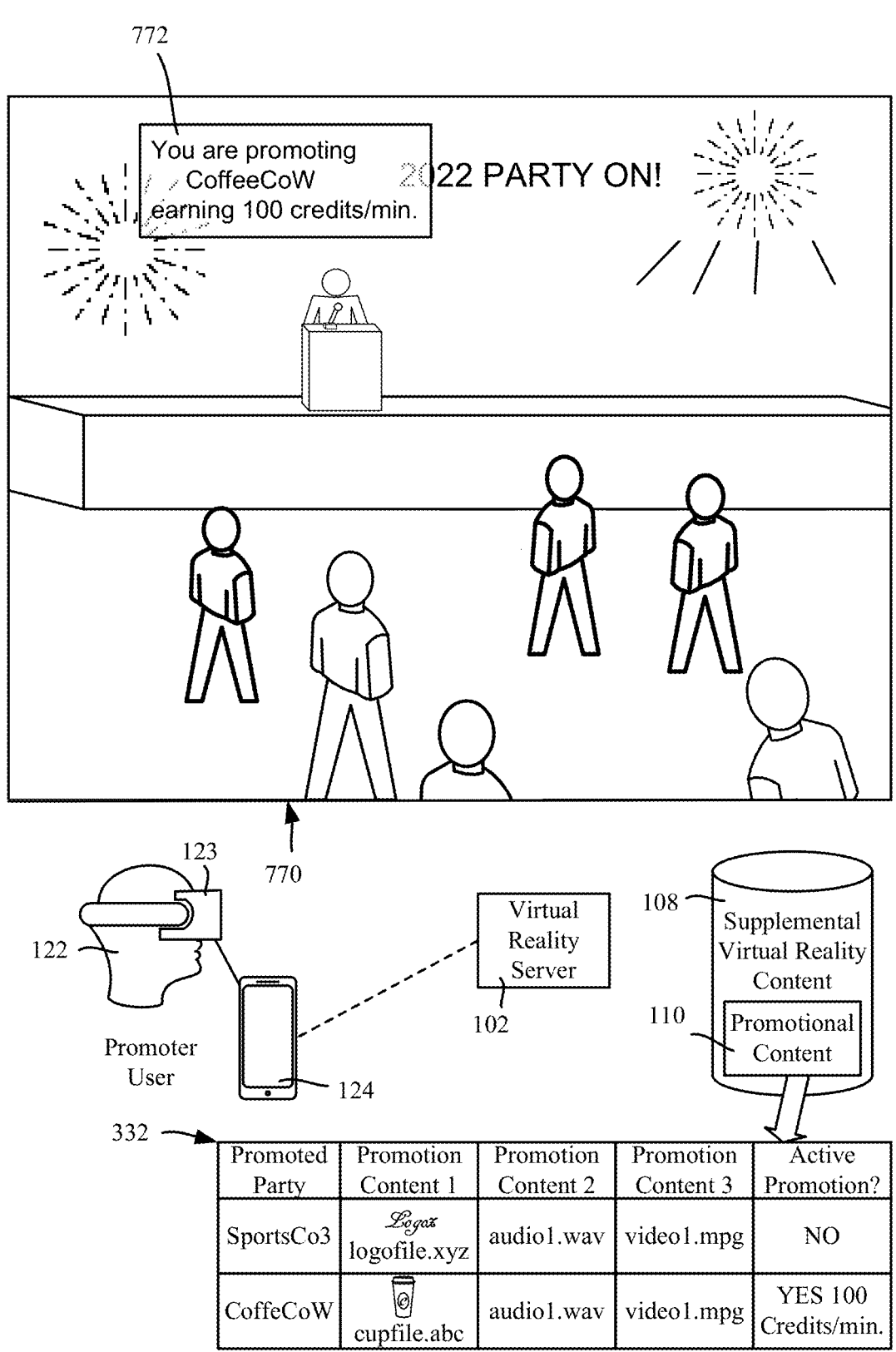
FIG. 7 is an example representation of a view of a promoter user overlaid with relative information related to current promotional content presentation, in accordance with various aspects and embodiments of the subject disclosure.

In using this promotion content placement approach, the promoter user may not necessarily know what product they are promoting at any given time. This problem may be solved by presenting a notification to the promoter user 122 as to his or her current promotion status. The notification can be interactively turned on or off (e.g., via gestures, audio and/or user interface interaction) by the promoter user. As represented in FIG. 7, over the promoter user's view 770, the notification may be a visual overlay 772 or the like that is inserted by the virtual reality server 102 that indicates what product(s) he or she is promoting, possibly what visual changes to the presented avatar have been applied, and what credit(s) he or she is earning. The active promotion(s) and any credit may be tracked in a field of the (updated) supplementary content data structure 332. A notification may alternatively be in the form of an audio presentation that is inserted into the audio stream presented to the promoter user 122. In another embodiment (not explicitly shown), the promoter user 122 may also see a mirror-like or self-view of his or her appearance within the promoter's view 770 to demonstrate the rendered version of his or her avatar with the promotion engaged. In a related embodiment, the produced self-view may be interactive for the promoter user 122 as a puppet of the user that mimics movements or rotatable as a miniature object.

Figure 8:
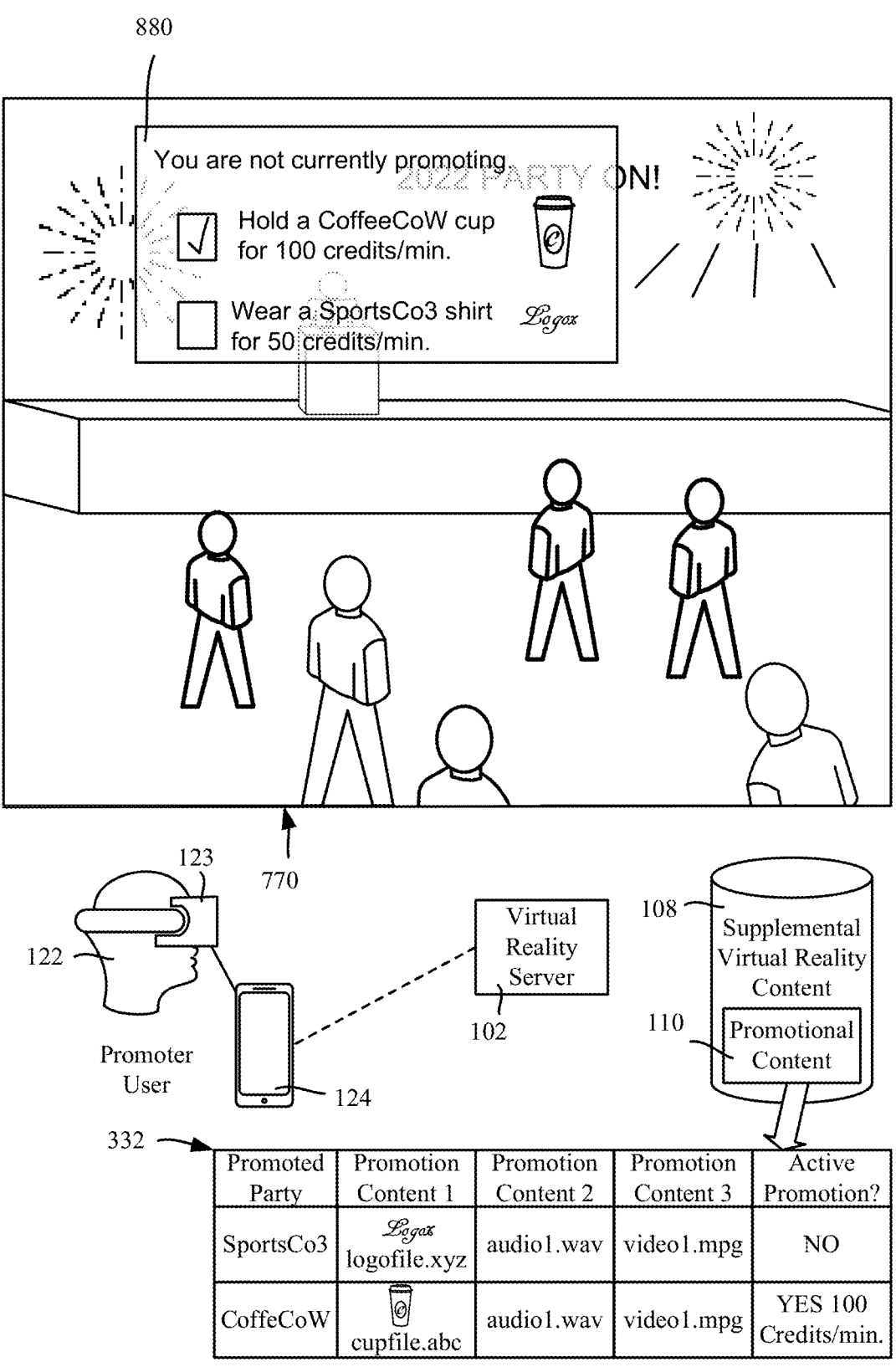
FIG. 8 is an example representation of a view of a promoter user overlaid with interactive information related to selecting from a group of promotional content offerings for presentation, in accordance with various aspects and embodiments of the subject disclosure.

As generally represented in FIG. 8, the promoter user 122 may also interact to receive a notification of promotional opportunities that are available to present, (as well as turn off such a notification). The promoter user 122 may select one or more opportunities to apply to their avatar via an interactive interface 880 with the virtual reality server 102 that presents the opportunities. These opportunities may come and go from the promoting party or parties. The notification may alternatively be in the form of an audio presentation that is inserted into the audio stream presented to the promoter user 122.

The determination as to what promotion opportunities are available at a given time for the promoter user may be based on the other avatars with which the promoter user interacts, the type of audience as described herein, and other considerations. For example, if the promoter user 122 is detected to not be in proximate location relative to other users that fit the target audience for the promoted party, a promotion opportunity may be deleted from the promoter user. For example, their coffee cup may simply disappear.

Further, in addition to selecting a promotion or selecting promotion(s) from a group of available promotions, the promoter user can turn off an advertisement. Consider for example promoter user that is virtually making a sales pitch to a competing company to CoffeeCoW. Ensuring that CoffeeCoW's cup does not appear may be beneficial to the promoter user.

Figure 9:
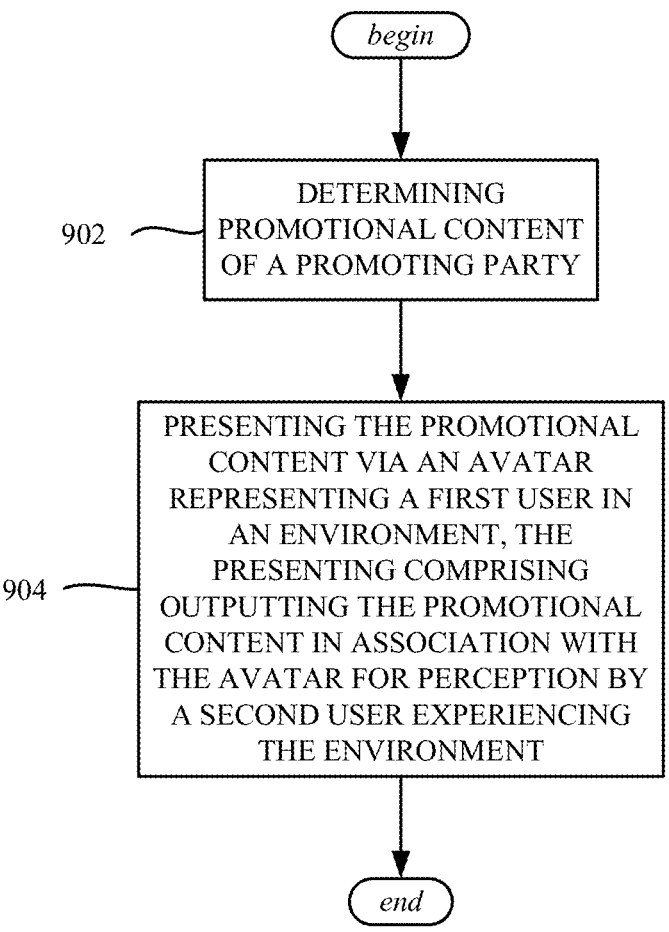
FIG. 9 is a flow diagram representing example operations related to presenting promotional content via an avatar outputting the promotional content for perception by a target user experiencing the environment, in accordance with various aspects and embodiments of the subject disclosure.

One or more example aspects are represented in FIG. 9, and can correspond to a system, including a processor, and a memory that stores executable instructions that, when executed by the processor, facilitate performance of operations. Example operation 902 represents determining promotional content of a promoting party. Example operation 904 represents presenting the promotional content via an avatar representing a first user in an environment, the presenting comprising outputting the promotional content in association with the avatar for perception by a second user experiencing the environment.

The environment can be a virtual reality environment.

Determining the promotional content can include obtaining target user data describing a characteristic of the second user, and selecting the promotional content from among a group of available promotional content offerings based on the target data.

The promotional content can include first promotional content, and further operations can include presenting second promotional content for perception by a third user experiencing the environment, in which the first promotional content is a different promotion from the second promotional content. Determining the promotional content can include obtaining first target user data describing a first characteristic of the second user, selecting the first promotional content from among a group of available promotional content offerings based on the first target data, obtaining second target user data describing a second characteristic of the second user, and selecting the second promotional content from among the group of available promotional content offerings based on the second target data.

The first user can select the promotional content from a group of available promotions.

Outputting the promotional content in association with the avatar can include outputting visible data for visual perception by the second user. Further operations can include obtaining target user data describing a characteristic of the second user, selecting attraction content based on the target user data, and presenting the attraction content in association with the avatar to attract the second user to view the promotional content. The visible data can include at least one of: a tattoo that alters an appearance of the avatar, clothing worn by the avatar, or an object associated with the avatar.

Outputting the promotional content in association with the avatar can include outputting audio for audible perception by the second user.

Outputting of the promotional content in association with the avatar can include outputting music associated with the promoting party.

Further operations can include detecting that the second user is viewing the avatar; presenting the promotional content can occur in response to the detecting.

Further operations can include presenting a notification to the first user that represents a current promotion status of the first user.

Figure 10:
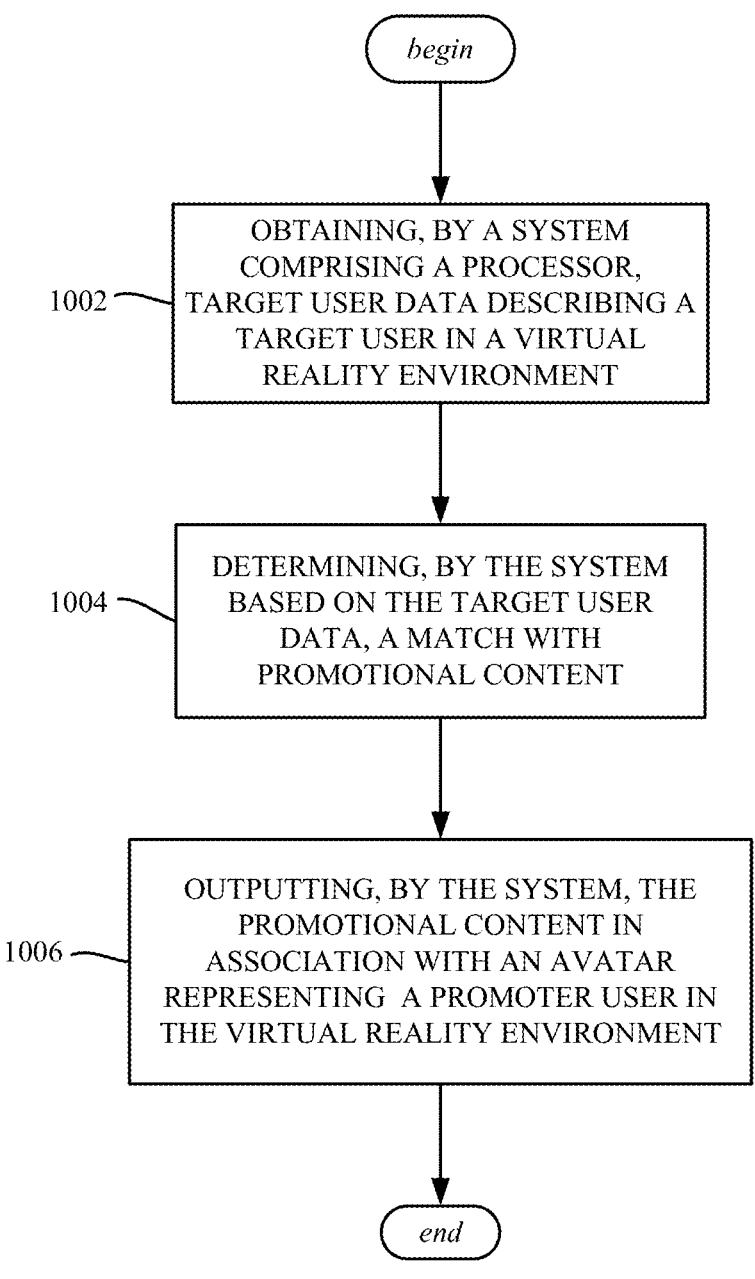
FIG. 10 is a flow diagram representing example operations related to outputting promotional content in association with an avatar representing a promoter user to a target user in the virtual reality environment based on target user data, in accordance with various aspects and embodiments of the subject disclosure.

One or more example aspects are represented in FIG. 10, and, for example, can correspond to operations, such as of a method. Example operation 1002 represents obtaining, by a system comprising a processor, target user data describing a target user in a virtual reality environment. Example operation 1004 represents determining, by the system based on the target user data, a match with promotional content. Example operation 1006 represents outputting, by the system, the promotional content in association with an avatar representing a promoter user in the virtual reality environment.

Outputting the promotional content in association with the avatar can include outputting at least one of: visible data for viewing by the target user, audio data for hearing by the second user, olfactory data for smell perception by the second user, taste data for taste perception by the second user, or tactile data for touch perception by the second user The target user data can be first target user data, the promotional content can be first promotional content, and further operations can include obtaining, by the system, second target user data describing a second target user in the virtual reality environment, determining, by the system, based on the second target user data, a match with second promotional content that is different from the first promotional content; and outputting by the system, the second promotional content in association with the avatar representing the promoter user in the virtual reality environment.

Further operations can include receiving, by the system from the promoter user, a selection of the promotional content from among a group of available promotions.

One or more aspects are represented in FIG. 11, such as implemented in a machine-readable medium, including executable instructions that, when executed by a processor, facilitate performance of operations. Example operation 1102 represents presenting promotional content via an avatar representing a first user in a virtual reality environment. The presenting can include example operation 1104, which represents accessing target user characteristic data describing user a second user in the virtual reality environment, example operation 1106, which represents determining, based on an evaluation of the target user characteristic data, that the second user matches the promotional content, example operation 1108, which represents altering an appearance of the avatar of the first user to generate an altered avatar associated with the promotional content, and example operation 1110, which represents outputting the altered avatar to the second user.

The promotional content can include first promotional content, wherein the target user characteristic data can include first target user characteristic data, wherein the evaluation can include a first evaluation, wherein the altered avatar can include a first altered avatar. Further operations can include accessing second target user characteristic data describing user a third user in the virtual reality environment, determining, based on a second evaluation of the second target user characteristic data, that the third user matches second promotional content, altering the appearance of the avatar of the first user to generate a second altered avatar associated with the second promotional content, and outputting the second altered avatar to the third user.

Further operations can include outputting attraction content that is likely to direct attention of the second user to view the altered avatar.

As can be seen, the technology described herein facilitates efficient and highly useful way for promoting parties to present promotions of their products or services within a virtual reality environment. The technology accomplishes the presentation of product and/or service promotions via the alteration of avatars or objects associated with the avatars that appear within a virtual reality environment. The promotions may be presented via visual, aural, and/or other avatar or object alterations, and may be created and presented based on an analysis of profile data of the presenting avatar as well as receiving target user(s).

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mm Wave spectrum, the millimeter waves have shorter wavelengths relative to other communications waves, whereby mm Wave signals can experience severe path loss, penetration loss, and fading. However, the shorter wavelength at mm Wave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mm Wave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beam-forming, and codebook-based precoding can also be used to address issues such as efficiency, interference, and range.

Figure 12:
FIG. 12 illustrates an example block diagram of an example mobile handset operable to engage in a system architecture that facilitates wireless communications according to one or more embodiments described herein.

Referring now to FIG. 12, illustrated is a schematic block diagram of an example end-user device (such as user equipment) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1235 facilitates the user initiating the quality feedback signal. The user input component 1235 can also facilitate the generation, editing and sharing of video quotes. The user input component 1235 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1246 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
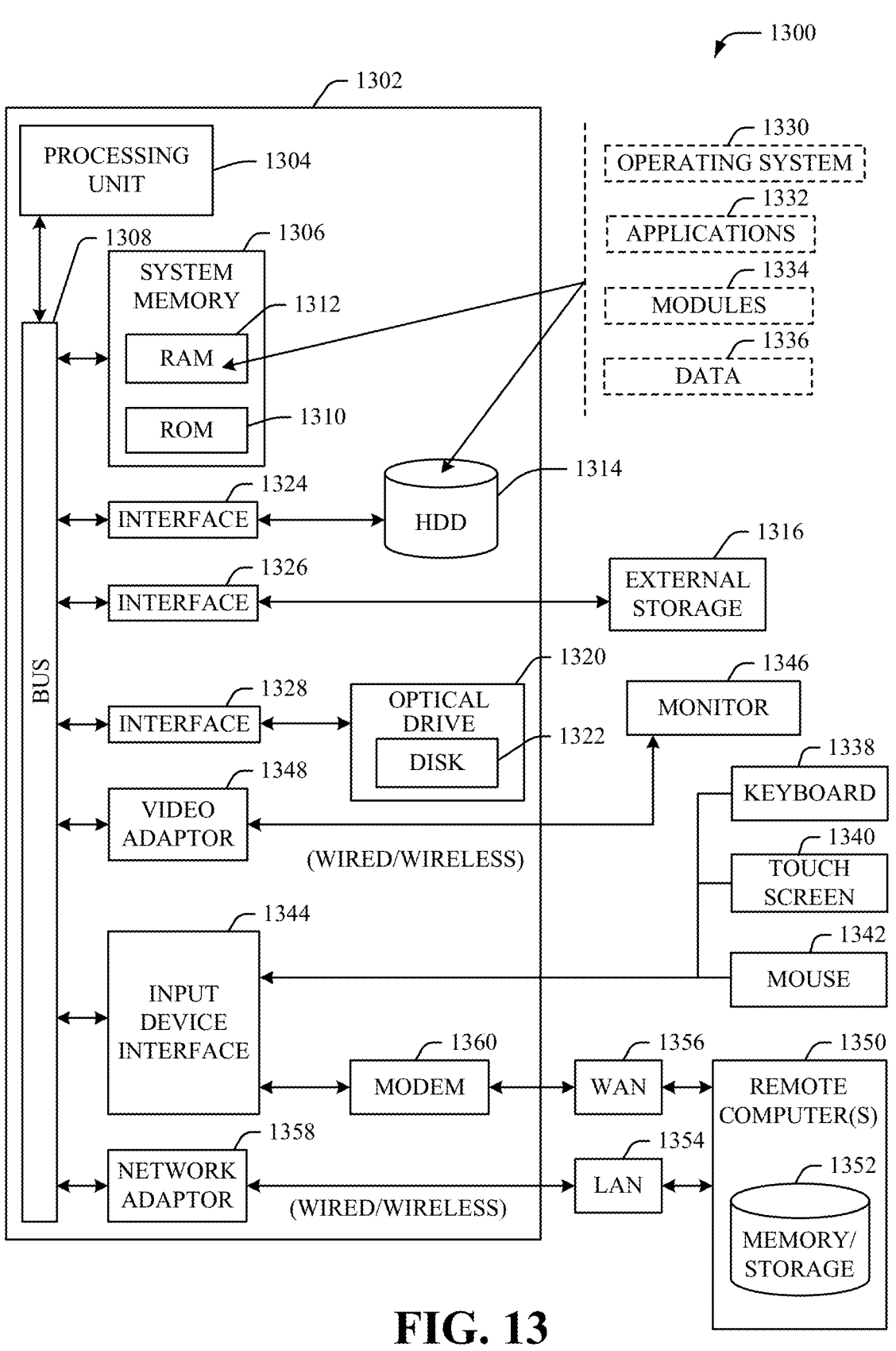
FIG. 13 illustrates an example block diagram of an example computer/machine system operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD), non-volatile memory and other storage technology could be used in addition to, or in place of, an HDD 1314, and can be internal or external. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1294 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 8 GHz radio bands, at an 13 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
a processor; and
a memory that stores executable instructions that, when executed by the processor of the system, facilitate performance of operations, the operations comprising:
determining an output device type of a user device of a second user, wherein the output device type includes at least a virtual reality device or a two-dimensional display device;
determining promotional content of a promoting party for presentation in conjunction with a first user in an environment;
selecting, based on the output device type of the user device of the second user, an output format for presentation of information including the promotional content on the user device of the second user, the output format conforming to the output device type of the user device of the second user to ensure reliable presentation of the information including the promotional content on the user device of the second user;
presenting the promotional content via an avatar representing the first user in an environment, wherein the presenting the promotional content comprises presenting the promotional content in one of a virtual reality format or a two-dimensional format, according to the output format, for viewing by the second user according to the output device type of the user device of the second user, the presenting comprising outputting the promotional content in association with the avatar for perception by the second user experiencing the environment;
obtaining target user data, wherein the target user data describes preferences of the second user; and
presenting attraction content in association with the avatar to attract the second user to view the promotional content, wherein the attraction content is distinct from the promotional content, wherein the attraction content is selected based on the target user data as an attention-catching element, wherein the presenting the attraction content comprises presenting the attraction content in the one of the virtual reality format or the two-dimensional format, according to the output format.

2. The system of claim 1, wherein the determining the output device type of the user device of the second user comprises:
determining the output device type of the user device of the second user based on the target user data.

3. The system of claim 1, wherein the determining of the promotional content comprises:
selecting the promotional content from among a group of available promotional content offerings, wherein the selecting is based on the target user data.

4. The system of claim 1, wherein the operations further comprise:
selecting second promotional content; and
presenting the second promotional content for perception by a third user experiencing the environment.

5. The system of claim 1, wherein the operations further comprise
storing the promotional content in a promotional content database, the promotional content comprising content combinable with primary virtual reality content in the environment; and
retrieving one or more content elements of the promotional content for presentation in the environment for the second user.

6. The system of claim 5, wherein the storing the promotional content comprises:
storing one or more content types of content as the one or more content elements of the promotional content, wherein the one or more content types include image data, audio data, video data and text data.

7. The system of claim 5, wherein the storing the promotional content comprises:
storing one or more promotional content elements for each promoted party including the first user.

8. The system of claim 1, wherein the operations further comprise:
detecting an encounter between the avatar and the second user in the environment; and
presenting the attraction content in response to the detecting the encounter between the avatar and the second user.

9. The system of claim 8, wherein the detecting the encounter comprises:
detecting a proximity of the avatar and the second user in the environment.

10. The system of claim 8, wherein the detecting the encounter comprises:
determining that the avatar is within a field of view of the second user in the environment.

11. A non-transitory machine-readable medium, comprising executable instructions that, when executed by a processing system including a processor, facilitate performance of operations, the operations comprising:
obtaining target user data associated with a target user in a virtual reality environment, the target user data including information about preferences of the target user;
determining a match with promotional content, wherein the determining the match is based on the target user data;

determining an output device type of a user device of a second user, wherein the output device type includes at least a virtual reality device or a two-dimensional display device;

selecting, based on the output device type of the user device of the target user, an output format for presentation of information including the promotional content on the user device of the target user, wherein the output format conforms to the output device type of the user device of the second user to ensure reliable presentation of the information including information including the promotional content on the user device of the target user;

presenting the promotional content in association with an avatar representing a promoter user in the virtual reality environment;

selecting attraction content, wherein the selecting the attraction content comprises selecting, based on the target user data, an attraction-catching element to catch attention of the target user in the virtual reality environment, wherein the attraction content is distinct from the promotional content; and presenting the attraction content in association with the avatar representing the promoter user to attract attention of the target user to view the promotional content, wherein the presenting the attraction content comprises presenting the attraction content in the one of a virtual reality format or a two-dimensional format, according to the output format.

12. The non-transitory machine-readable medium of claim 11, wherein the operations further comprise:

determining the output device type of the user device of the target user based on the target user data.

13. The non-transitory machine-readable medium of claim 11, wherein the presenting the promotional content comprises:

presenting the promotional content in one of the virtual reality format or the two-dimensional format, according to the output format, for viewing by the target user according to the output device type of the user device of the target user.

14. The non-transitory machine-readable medium of claim 11, wherein the selecting the attraction content comprise:

selecting the attraction content to draw attention of the target user to the avatar representing the promoter user in order to expose the target user to the promotional content.

15. The non-transitory machine-readable medium of claim 11, wherein the operations further comprise:

presenting, to the promoter user, a notification, the notification visible by the promoter user in the virtual reality environment and indicating one or more products being promoted.

16. A method, comprising:

presenting, by a processing system including a processor, promotional content via an avatar representing a promoter user in a virtual reality environment, the presenting comprising:

accessing, by the processing system, target user characteristic data of a second user in the virtual reality environment;

determining, by the processing system, a match between the second user and the promotional content, wherein the determining a match is based on an evaluation of the target user characteristic data;

altering, by the processing system, an appearance of the avatar of the promoter user to generate an altered avatar associated with the promotional content;

selecting, by the processing system, attraction content, including selecting the attraction content based on the evaluation of the target user characteristic data and selecting one or more attraction-catching elements to draw attention of the second user to the altered avatar to expose the second user to the promotional content, wherein the attraction content and the one or more attraction-catching elements are distinct from the promotional content;

determining an output device type of a user device of the second user, wherein the output device type includes at least a virtual reality device or a two-dimensional display device;

selecting, by the processing system, based on the output device type of the user device of the second user, an output format for presentation of information, the output format conforming to the output device type of the user device of the second user for reliable presentation of the altered avatar and the attraction content on the user device of the second user; and presenting, by the processing system, the altered avatar and the attraction content to the second user, wherein the presenting the altered avatar and the attraction content comprises presenting the attraction content and the altered avatar in a virtual reality format or a two-dimensional format, according to the output format.

17. The method of claim 16, comprising:

obtaining, by the processing system, a user profile of the second user; and determining, by the processing system, the output device type of the user device of the second user based on the user profile of the second user.

18. The method of claim 16, comprising:

storing, by the processing system, the promotional content in a promotional content database, the promotional content comprising content combinable with primary virtual reality content in the virtual reality environment; and retrieving, by the processing system, one or more content elements of the promotional content for presentation in the virtual reality environment for the second user.

19. The method of claim 18, comprising:

storing, by the processing system, one or more content types of content as the one or more content elements of the promotional content, wherein the one or more content types include image data, audio data, video data and text data.

20. The method of claim 16, comprising:

detecting, by the processing system, an encounter between the avatar and the second user in the virtual reality environment; and presenting, by the processing system, the attraction content in response to the detecting the encounter between the avatar and the second user.

* * * * *